United States Patent [19]

Wyant

[11] 4,162,588
[45] Jul. 31, 1979

[54] LIVE ANIMAL TRAP

[76] Inventor: Melvin F. Wyant, Box 291, Monroe City, Ind. 47557

[21] Appl. No.: 856,620

[22] Filed: Dec. 2, 1977

[51] Int. Cl.² ............................................. A01M 23/02
[52] U.S. Cl. ......................................................... 43/61
[58] Field of Search ..................................... 43/60–61, 43/74, 76

[56] References Cited

U.S. PATENT DOCUMENTS 3,483,652  12/1969  Hanlan ...................................... 43/61

FOREIGN PATENT DOCUMENTS 20698 of 1890 United Kingdom ........................ 43/61
18679 of 1911 United Kingdom ........................ 43/61

Primary Examiner—Robert C. Watson
Attorney, Agent, or Firm—Daniel Jay Tick

[57] ABSTRACT

A rod is rotatably mounted parallel to and above the bottom in a cage near the back. A bait tray is affixed to the rod in a manner whereby the tray is rotated by an animal taking bait therefrom. A trigger device including a plurality of linking rods couples the bait tray to the hook of a pivotally mounted door at the front of the cage in a manner whereby the door is maintained in open position next-adjacent the top in the cage by one of the linking rods when the bait tray is free from disturbance and the one of the linking rods is withdrawn from the hook of the door to close the door and seal the cage when the bait tray is rotated.

2 Claims, 3 Drawing Figures

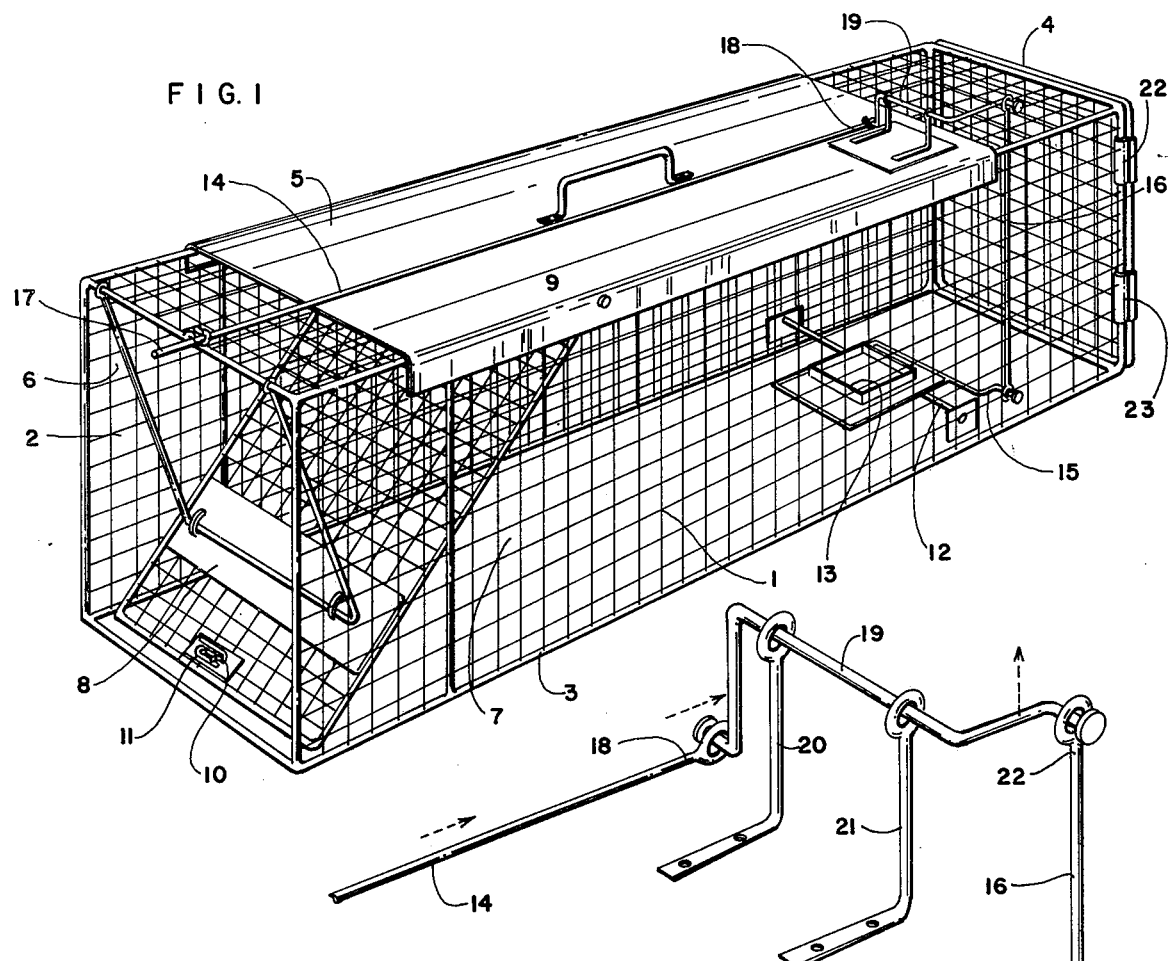
FIG. 1
FIG. 2
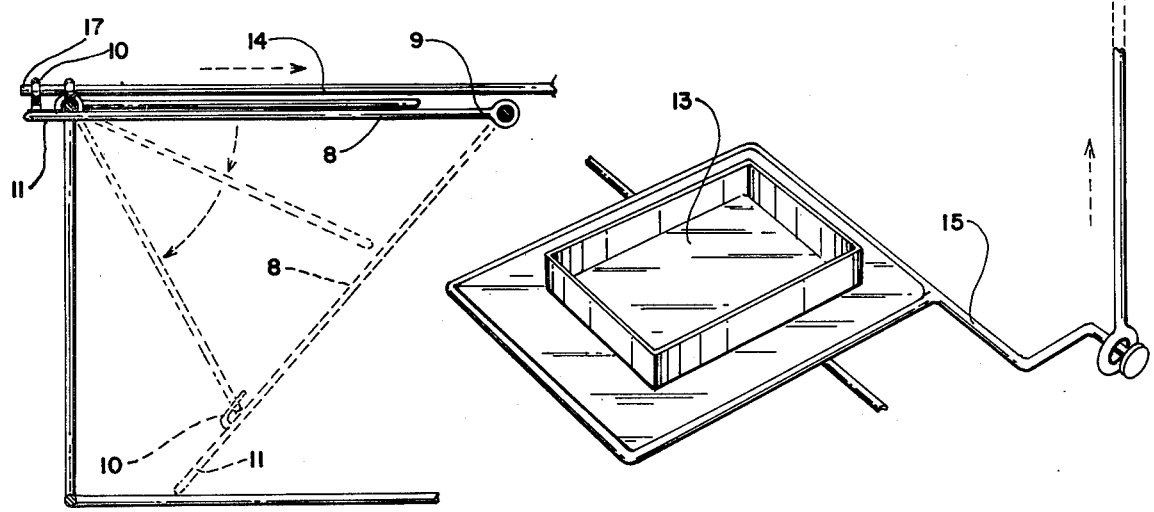
FIG. 3

LIVE ANIMAL TRAP

BACKGROUND OF THE INVENTION

The present invention relates to a live animal trap. More particularly, the invention relates to a live animal trap for capturing and restraining a live animal.

Animal traps similar to that described herein are disclosed in the following U.S. Pat. Nos. 3,394,487, issued to Wood et al on July 30, 1968, 3,483,652, issued to Hanlan on Dec. 16, 1969, 3,624,951, issued to Gilbaugh on Dec. 7, 1971, 3,834,063, issued to Souza et al on Sept. 10, 1974, 3,913,258, issued to Souza et al on Oct. 21, 1975 and 3,975,857, issued to Branson on Aug. 24, 1976.

Objects of the invention are provided a line animal trap of simple structure, which is inexpensive in manufacture, set or baited and emptied with facility and convenience, and functions efficiently, effectively and reliably to trap an animal live, without injuring the animal, as soon as the animal tampers with bait provided in the trap.

BRIEF DESCRIPTION OF THE DRAWINGS

In order that the invention may be readily carried into effect, it will now be described with reference to the accompanying drawings, wherein:

FIG. 1 is a perspective view of an embodiment of the live animal trap of the invention:

FIG. 2 is a perspective view, on an enlarged scale, of the trigger device of the trap of the invention; and FIG. 3 is a view illustrating a closing of the door of the cage of the trap of the invention by the trigger device.

DETAILED DESCRIPTION OF THE INVENTION

The live animal trap of the invention is for capturing and restraining a live animal. The live animal trap of the invention comprises a cage 1 having an open front 2, a closed bottom 3, a hinged back 4, a closed top 5 and a pair of closed sides 6 and 7, as shown in FIG. 1.

A door 8 (FIGS. 1 and 3) is pivotally mounted at the top of the sides 6 and 7 in the cage 1 at one end 9 thereof (FIGS. 1 and 3). The door 8 has a hook 10 at its opposite end 11 (FIGS. 1 and 3).

A rod 12 is rotatably mounted parallel to, and above, the bottom 3 in the cage 1 near the back 4, as shown in FIG. 1.

A bait tray 13 (FIGS. 1 and 2) is affixed to the rod 12, as shown in FIG. 1, in a manner whereby the tray is rotated by an animal taking bait therefrom.

A trigger device, including a plurality of linking rods, couples the bait tray 13 to the hook 10 of the door 8 in a manner whereby said door is maintained in open position, shown by solid lines in FIG. 3, substantially next-adjacent the top 5 in the cage 1 by one of the linking rods 14 when the bait tray is free from disturbance. The linking rod 14 is withdrawn from the hook 10 of the door 8 to close the door, shown by broken lines in FIG. 3, and seal the cage 1, when the bait tray 13 is rotated. That is, the door 8 closes rapidly, due to gravitational force, as soon as the linking rod 14 is released from the hook 10 of said door.

The trigger device comprises a first linking rod 15 affixed to the bait tray 13 in the cage, as shown in FIGS. 1 and 2. A second linking rod 16 (FIGS. 1 and 2) is coupled to the first linking rod 15 and extends from said first linking rod through the cage 1 and through the top 5 of the cage to the outside thereof. The third linking rod 14 extends along the top 5 of the cage, outside the cage, and has spaced opposite first and second ends 17 and 18 (FIG. 1).

The first end 17 of the third linking rod 14 cooperates with the hook 10 of the door 8, as shown by solid lines in FIG. 3. A fourth angular linking arm 19 (FIGS. 1 and 2) is rotatably mounted on the top 5 of the cage 1 outside said cage via a pair of angle members 20 and 21 having eyes formed at their free ends. The fourth angular linking arm 19 couples the outside end 22 of the second linking arm 16 to the second end 18 of the third linking arm 14, as shown in FIGS. 1 and 2, in a manner whereby counter-clockwise rotation of the bait tray 13 moves the first and second linking rods 15 and 16 up toward the top 5 of the cage 1 and moves the third linking rod 14 from the front 2 to the back 4 to release the hook 10 and thereby cause the door 8 to close.

The hinged back 4 is a back door mounted on hinges 22 and 23, as shown in FIG. 1, to provide access to the cage.

While the invention has been described by means of a specific example and in a specific embodiment, I do not wish to be limited thereto, for obvious modifications will occur to those skilled in the art without departing from the spirit and scope of the invention.

I claim:

1. A live animal trap for capturing and restraining a live animal, said live animal trap comprising
   a cage having an open front, a closed bottom, a back, a closed top and a pair of closed sides;
   a door pivotally mounted at the top of the sides in the cage at one end and having a hook at its opposite end;
   a rod rotatably mounted parallel to and above the bottom in the cage near the back;
   a bait tray affixed to the rod in a manner whereby said tray is rotated by an animal taking bait therefrom; and
   a trigger device including a plurality of linking rods coupling the bait tray to the hook of the door in a manner whereby the door is maintained in open position substantially next-adjacent the top in the cage by one of the linking rods when the bait tray is free from disturbance and said one of said linking rods is withdrawn for the hook of the door to close the door and seal the cage when the bait tray is rotated, said trigger device comprising a first linking rod affixed to the bait tray in the cage, a second linking rod coupled to the first linking rod and extending from said first linking rod through the cage and through the top of the cage to the outside thereof, a third linking rod extending along the top of the cage outside the cage and having spaced opposite first and second ends, the first end of the third linking rod cooperating with the hook of the door and a fourth angular linking arm rotatably mounted on top of the cage outside the cage and coupling the outside end of the second linking arm to the second end of the third linking arm in a manner whereby counterclockwise rotation of the bait tray moves the first and second linking rods up toward the top of the cage and moves the third linking rod from the front to the back to release the hook.

2. A live animal trap for capturing and restraining a live animal, said live animal trap comprising a cage having an open front, a closed bottom, a back, a closed top and a pair of closed sides;

a door pivotally mounted at the top of the sides in the cage at one end and having a hook at its opposite end, said door being mounted at points intermediate the front and back of said cage;

a rod rotatably mounted parallel to and above the bottom in the cage near the back;

a bait tray affixed to the rod in a manner whereby said tray is rotated by an animal taking bait therefrom; and a trigger device including a plurality of linking rods coupling the bait tray to the hook of the door in a manner whereby the door is maintained in open position substantially next-adjacent the top in the cage by one of the linking rods when the bait tray is free from disturbance and said one of said linking rods is withdrawn from the hook of the door said one end of said door falls inward and downward toward the bottom and back of said cage to close the door and seal the cage when the bait tray is rotated, said trigger device comprising a first linking rod affixed to the bait tray in the cage, a second linking rod in said cage coupled to the first linking rod and extending from said first linking rod through the cage and through the top of the cage to the outside thereof, a third linking rod extending along the top of the cage outside the cage and having spaced opposite first and second ends, the first end of the third linking rod cooperating with the hook of the door and a fourth angular linking arm rotatably mounted on top of the cage outside the cage and coupling the outside end of the second linking arm to the second end of the third linking arm in a manner whereby rotation of the bait tray by the weight of an animal on said tray moves the first and second linking rods up toward the top of the cage thereby rotating said fourth linking arm in a direction which moves the third linking rod from the front to the back to release the hook.

* * * * *